United States Patent

Utagawa

(10) Patent No.: US 8,139,144 B2
(45) Date of Patent: Mar. 20, 2012

(54) FOCUS DETECTION DEVICE, FOCUS DETECTION METHOD AND IMAGING APPARATUS

(75) Inventor: Ken Utagawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 336 days.

(21) Appl. No.: 12/267,654

(22) Filed: Nov. 10, 2008

(65) Prior Publication Data

US 2009/0174806 A1  Jul. 9, 2009

(30) Foreign Application Priority Data

Nov. 12, 2007  (JP) ................. 2007-292880

(51) Int. Cl.
G03B 13/00 (2006.01)
H04N 5/232 (2006.01)

(52) U.S. Cl. ............. 348/352; 348/230.1; 348/296

(58) Field of Classification Search .... 348/208.1–208.5, 348/208.7, 208.11–208.13, 208.16, 208.99, 348/215.1, 230.1, 262, 296, 302, 345, 348–351, 348/354, 356, 346, 347, 352, 353, 355; 396/100, 396/121

See application file for complete search history.

(56) References Cited

U.S. PATENT DOCUMENTS

| | | | | |
|---|---|---|---|---|
| 4,774,538 A * | 9/1988 | Kawai | | 396/53 |
| 5,262,871 A * | 11/1993 | Wilder et al. | | 348/307 |
| 6,473,126 B1 * | 10/2002 | Higashihara et al. | | 348/345 |
| 6,721,013 B1 * | 4/2004 | Tsujino | | 348/345 |
| 6,781,632 B1 * | 8/2004 | Ide | | 348/345 |
| 6,819,360 B1 * | 11/2004 | Ide et al. | | 348/340 |
| 2005/0007460 A1 * | 1/2005 | Stavely et al. | | 348/222.1 |
| 2009/0153710 A1 * | 6/2009 | John | | 348/296 |

FOREIGN PATENT DOCUMENTS

| | | |
|---|---|---|
| JP | 10-177137 | 6/1998 |
| JP | 2000-209509 | 7/2000 |
| JP | 2000-292686 | 10/2000 |
| JP | 2002-314062 | 10/2002 |
| JP | 2006-217213 | 8/2006 |
| JP | 2007-129502 | 5/2007 |

OTHER PUBLICATIONS

Japanese Office Action for corresponding JP Application No. 2007-292880, Nov. 8, 2011.

* cited by examiner

*Primary Examiner* — Lin Ye
*Assistant Examiner* — Chriss Yoder, III
(74) *Attorney, Agent, or Firm* — Ditthavong Mori & Steiner, P.C.

(57) ABSTRACT

A focus detection device includes an imaging element, a storage controller, and a focus detector. The imaging element is provided on a light path of a light flux incident via an optical system and has a plurality of pixels of charge storage type two-dimensionally arranged. The storage controller controls to sequentially store charges in pixels arranged in a first direction among the plurality of pixels and controls to sequentially store charges in pixels arranged in a second direction opposite to the first direction. The focus detector detects a focus adjustment state of the optical system based on a first output obtained when the storage controller sequentially performs storage control in the first direction and a second output obtained when the storage controller sequentially performs storage control in the second direction.

13 Claims, 6 Drawing Sheets

FOCUS DETECTION DEVICE, FOCUS DETECTION METHOD AND IMAGING APPARATUS

CROSS-REFERENCE TO RELATED APPLICATION

The present application claims priority to Japanese Patent Application No. 2007-292880 filed on Nov. 12, 2007. The entire contents of Japanese Patent Application No. 2007-292880 are incorporated herein by reference.

BACKGROUND OF THE INVENTION

1. Field of the Invention

The present invention relates to a focus detection device, a focus detection method, and an imaging apparatus.

2. Description of the Related Art

There is a known focus detection device that detects a focus adjustment state of an imaging lens by receiving a first image formed with a light flux passing through one of two pupil regions of the subject imaging lens and a second image formed with a light flux passing through the other pupil region by using a solid-state imaging element, and calculating a shift amount between the first image and the second image (see Japanese Unexamined Patent Publication No. 2002-314062, for example).

However, the conventional focus detection device uses a solid-state imaging element of CMOS type. Focus detection pixels arranged in a transverse direction of an image capturing screen is the same as a direction of a signal read line of the CMOS imaging element, but the focus detection pixels arranged in a direction other than the transverse direction of the image capturing screen, such as a longitudinal direction of the image capturing screen, is different from the direction of the signal read line of the CMOS imaging element. As a result, there is the problem that synchronism in charge storing time cannot be maintained among the focus detection pixels.

Therefore, if there is movement in an image while charge storing is performed on the focus detection pixels arranged in a direction other than the transverse direction of the image capturing screen, image misalignment is caused between the first image and the second image due to the image movement. As a result, the image shift amount between the first image and the second image cannot be accurately calculated, and the focus detection accuracy is degraded.

SUMMARY OF THE INVENTION

A focus detection device according to the present invention includes an imaging element that is provided on a light path of a light flux incident via an optical system and that has a plurality of pixels of charge storage type two-dimensionally arranged, a storage controller configured to control to sequentially store charges in pixels arranged in a first direction among the plurality of pixels and configured to control to sequentially store charges in pixels arranged in a second direction opposite to the first direction, and a focus detector configured to detect a focus adjustment state of the optical system based on a first output obtained when the storage controller sequentially performs storage control in the first direction and a second output obtained when the storage controller sequentially performs storage control in the second direction.

The storage controller may be configured to perform a control sequentially in a fourth direction perpendicular to the third direction. Charges are simultaneously stored in pixels arranged in a third direction perpendicular to the first direction in the control.

The fourth direction may include the first direction or the second direction.

The focus detector may determine the focus adjustment state of the optical system by calculating a mean value between a focus adjustment state determined based on the first output and a focus adjustment state determined based on the second output.

The focus detection device may further include a movement detector configured to detect a movement direction of an image formed by the optical system, wherein the focus detector prohibits detection of the focus adjustment state of the optical system based on the first output and the second output when the movement direction of the image detected by the movement detector differs between the first direction and the second direction.

The imaging element may include imaging pixels configured to receive the light flux via the optical system and output an image signal. The imaging pixels are arranged in a two-dimensional array, and a focus detection pixel row provided in the array and arranged in the first direction.

An imaging apparatus according to the present invention includes the focus detection device as described above.

A focus detection method includes arranging a plurality of charge storage pixels in a two-dimensional fashion on a light path of a light flux incident via an optical system, controlling pixels arranged in a first direction among the plurality of pixels to store charges in a sequential manner, and controlling pixels arranged in a second direction opposite to the first direction to store charges in a sequential manner, and detecting a focus adjustment state of the optical system based on a first output obtained when storage control is sequentially performed in the first direction and based on a second output obtained when storage control is sequentially performed in the second direction.

A control in which charges are simultaneously stored in pixels arranged in a third direction perpendicular to the first direction may be performed sequentially in a fourth direction perpendicular to the third direction.

The fourth direction may include the first direction or the second direction.

The step of detecting the focus adjustment state may include determining the focus adjustment state of the optical system by calculating a mean value between a focus adjustment state determined based on the first output and a focus adjustment state determined based on the second output.

The focus detection method may further include detecting a movement direction of an image formed by the optical system, wherein detecting the focus adjustment state of the optical system based on the first output and the second output is prohibited when the detected movement direction of the image differs between the first direction and the second direction.

The step of arranging the plurality of pixels may include arranging, in a two-dimensional array, imaging pixels that receive the light flux via the optical system and output an image signal, and arranging a focus detection pixel row in the first direction in the array of the imaging pixels.

DESCRIPTION OF THE PREFERRED EMBODIMENTS

Figure 1:
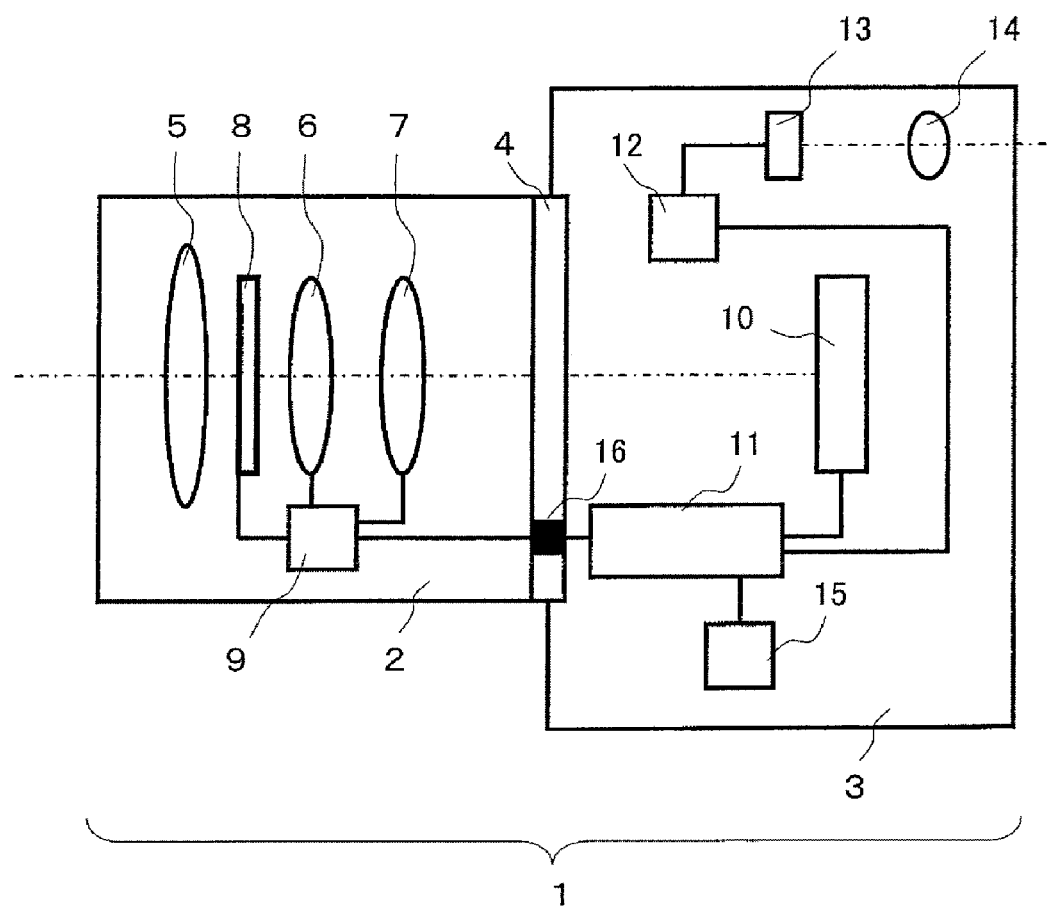
FIG. 1 is a horizontal cross-sectional view showing a structure of a camera in accordance with an embodiment.

As an example of a focus detection device and an imaging apparatus of an embodiment of the present invention, a digital still camera with interchangeable lenses is described. The focus detection device and the imaging apparatus of the present embodiment can be applied not only to a camera with interchangeable lenses, but also to a lens-incorporated camera. FIG. 1 is a horizontal cross-sectional view showing a structure of a camera of the present embodiment. A digital still camera 1 of the present embodiment includes an interchangeable lens unit 2 and a camera body 3. The interchangeable lens unit 2 is mounted to the camera body 3 via a mounting portion 4.

The interchangeable lens unit 2 includes a lens 5, a zoom lens 6, a focus lens 7, a diaphragm 8, and a lens drive control device 9. The lens drive control device 9 includes a microcomputer, a memory, and a drive control circuit, and the like (not shown). The lens drive control device 9 performs drive control for adjusting a focal point of the focus lens 7 and an aperture size of the diaphragm 8, and detects states of the focus lens 7 and the diaphragm 8. The lens drive control device 9 also transmits lens information and receives camera information through communications with a body drive control device 11 described below. The diaphragm 8 forms an aperture with a variable aperture size around an optical axis, so as to adjust a light amount and defocus amount.

The camera body 3 includes an imaging element 10, the body drive control device 11, a liquid crystal display element drive circuit 12, a liquid crystal display element 13, an eye lens 14, and a memory card 15. The imaging element 10 is a CMOS two-dimensional imaging element. Pixels for picking up images are two-dimensionally arranged on an imaging face of the imaging element 10. The pixels for focus detection are arranged at portions corresponding to a focus detection region in a region including the two-dimensionally arranged imaging pixels on the imaging face.

The body drive control device 11 includes a microcomputer, a memory, a drive control circuit, and the like. The body drive control device 11 repeatedly controls charge storage of the imaging element 10, reads an image signal and a focus detection signal, performs a focus detecting operation based on the focus detection signal, and adjusts the focal point of the interchangeable lens unit 2. The body drive control device 11 further performs processing and recording of image signals, and controls the camera operation. The body drive control device 11 also communicates with the lens drive control device 9 via an electric contact 16, to receive the lens information and transmit the camera information (the defocus amount and a diaphragm value).

The liquid crystal display element 13 functions as a liquid crystal view finder (EVF: electric view finder). The liquid crystal display element drive circuit 12 displays a through image on the liquid crystal display element 13, and a photographer can see the through image via the eye lens 14. The memory card 15 is an image storage that stores images picked up by the imaging element 10.

A subject image is formed on a light receiving face of the imaging element 10 by a light flux that has passed through the interchangeable lens unit 2. The subject image is photoelectrically converted by the imaging element 10, and an image signal and a focus detection signal are transmitted to the body drive control device 11.

The body drive control device 11 calculates the defocus amount, based on the focus detection signal from the focus detection pixels of the imaging element 10, and transmits the defocus amount to the lens drive control device 9. The body drive control device 11 also performs processing on the image signal transmitted from the imaging element 10, and stores the image signal into the memory card 15. The body drive control device 11 further transmits a through image signal sent from the imaging element 10 to the liquid crystal display element drive circuit 12, and displays the through image on the liquid crystal display element 13. The body drive control device 11 also transmits diaphragm control information to the lens drive control device 9, so as to control the aperture of the diaphragm 8.

The lens drive control device 9 modifies the lens information, based on a focusing state, a zooming state, a diaphragm setting state, a diaphragm opening F value, and the like. More specifically, the lens drive control device 9 detects locations of the zoom lens 6 and the focus lens 7, and the diaphragm value of the diaphragm 8. The lens drive control device 9 then calculates the lens information in accordance with the locations of those lenses and the diaphragm value, or selects the lens information corresponding to the locations of the lenses and the diaphragm value from a lookup table that is prepared in advance.

The lens drive control device 9 calculates a lens drive amount, based on the received defocus amount. The lens drive control device 9 then drives the focus lens 7 to a focusing position in accordance with the lens drive amount. The lens drive control device 9 also drives the diaphragm 8 in accordance with the received diaphragm value.

The interchangeable lens unit 2 that includes various imaging optical systems can be mounted to the camera body 3 via the mounting portion 4. Based on an output of the focus detection pixels incorporated into the imaging element 10, the camera body 3 detects the focus adjustment state of the interchangeable lens unit 2.

Figure 2:
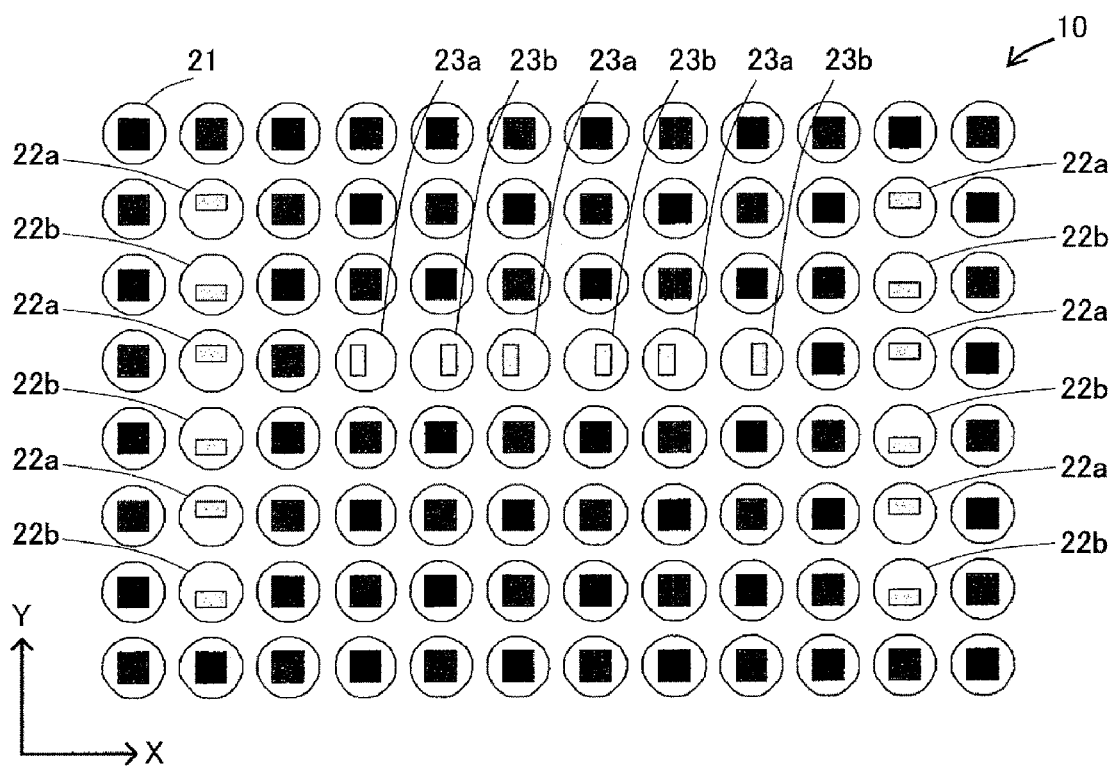
FIG. 2 is an enlarged view of a part of an imaging element of the embodiment.

FIG. 2 is an enlarged view of a part of the imaging element 10 of FIG. 1. As described above, imaging pixels 21 are two-dimensionally arranged on the imaging face of the imaging element 10. At the portions corresponding to the focus detection locations in the imaging face of the imaging element 10, focus detection pixels 22a and 22b, instead of the imaging pixels 21, are arranged in a Y-direction shown in FIG. 2, and focus detection pixels 23a and 23b, instead of the imaging pixels 21, are arranged in an X-direction shown in FIG. 2. The imaging pixels 21 and the focus detection pixels 22a, 22b, 23a, and 23b are each formed with a microlens and a photoelectric converter. The focus detection pixels 22a and 22b receive the focus detection light fluxes that have passed through a pair of upper and lower regions existing above an exit pupil of the interchangeable lens unit 2, and outputs a first signal and a second signal about a pair of images that are a first image and a second image. The focus detection pixels 23a and 23b receive the focus detection light fluxes that have passed through a pair of left and right regions existing above the exit pupil of the interchangeable lens unit 2, and outputs a first signal and a second signal about a pair of images that are a first image and a second image.

Based on a first signal string {a(i)}=a(1), a(2), a(3), a(4), ... and a second signal string {b(i)}=b(1), b(2), b(3), b(4), ... that are output from a pixel row of the focus detection pixels 22a and 22b, the body drive control device 11 detects the focus adjustment state of the interchangeable lens unit 2 in a transverse direction of an image capturing screen (the Y-direction in FIG. 2). Likewise, based on a first signal string {a(i)}=a(1), a(2), a(3), a(4), ... and a second signal string {b(i)}=b(1), b(2), b(3), b(4), ... that are output from a pixel row of the focus detection pixels 23a and 23b, the body drive control device 11 detects the focus adjustment state of the interchangeable lens unit 2 in a longitudinal direction of the image capturing screen (the X-direction in FIG. 2).

The method for detecting shift amount of the pair of images based on the first signal string {a(i)} (i=1, 2, 3, ...) and the second signal string {b(i)} (i=1, 2, 3, ...) is now described. First, a correlation between the first signal string {a(i)} and the second signal string {b(i)} or a correlation C(N) between the pair of images is determined according to the following equation:

$$C(N)=|\Sigma a(i)-b(j)|,$$

$$j-i=N \quad (1)$$

where $\Sigma$ represents a total sum of i=pL through qL, and N represents a shift number.

Of the correlations C(N) obtained discretely according to the equation (1), the correlation that becomes the smallest when the shift amount is N is C0, and the correlation obtained when the shift amount is N−1 is Cr, and the correlation obtained when the shift amount is N+1 is Cf. Based on the correlations Cr, C0, and Cf corresponding to the shift amounts (N−1), N, and (N+1), an accurate shift amount Na is determined according to the following equations:

$$DL=0.5*(Cr-Cf) \quad (2)$$

$$E=MAX\{Cf-C0,Cr-C0\} \quad (3)$$

$$Na=N+DL/E \quad (4)$$

A correction amount const (constant) corresponding to the focus detection position is added to the shift amount Na, to obtain an image shift amount Δn (=Na+const) on the focus detection face. Further, the image shift amount Δn is multiplied by a constant Kf that depends on a detection opening angle, and is thus converted into a defocus amount Df.

$$Df=Kf*\Delta n \quad (5)$$

Figure 3:
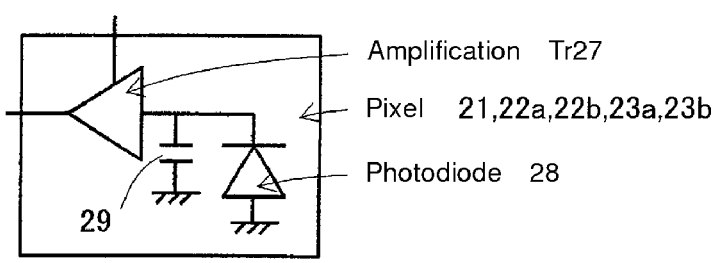
FIG. 3 shows a circuit structure of imaging pixels and focus detection pixels in detail.
Figure 4:
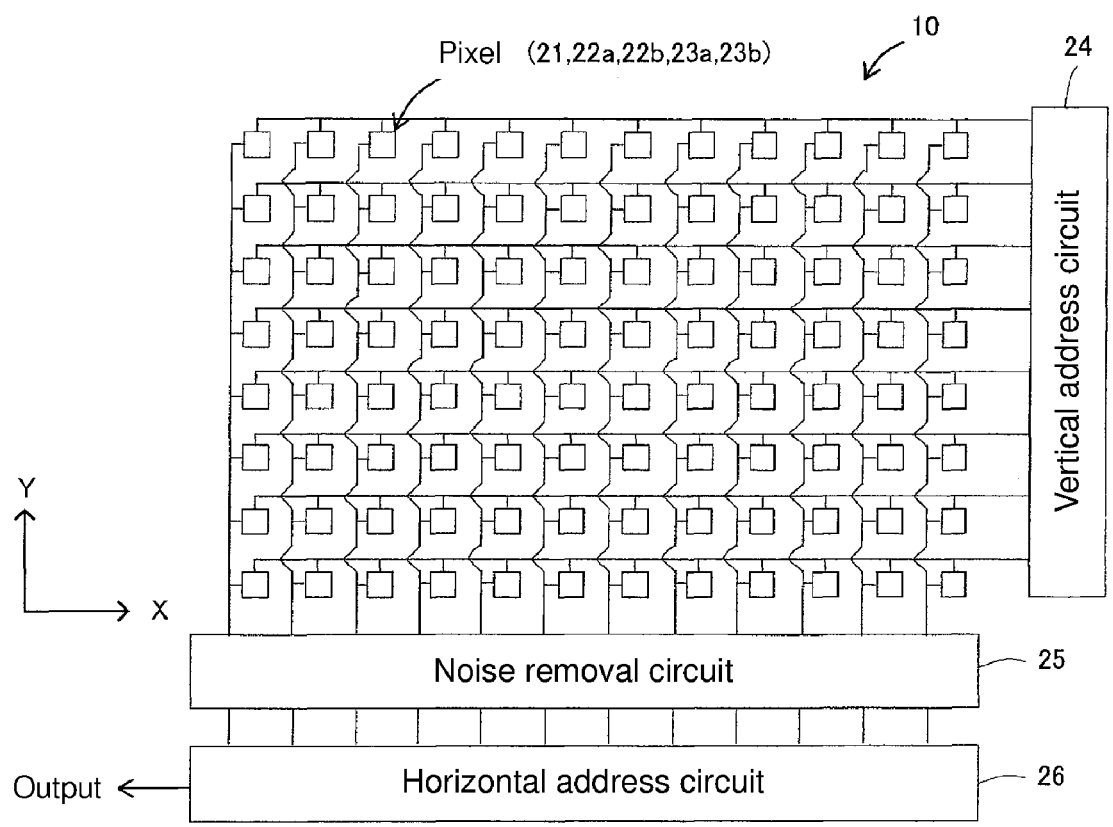
FIG. 4 shows a circuit structure of the imaging element of the embodiment.

FIG. 3 shows a circuit structure of the imaging pixels and the focus detection pixels in detail. FIG. 4 shows a circuit structure of the imaging element 10 of FIGS. 1 and 2. As shown in FIG. 3, the imaging pixels 21 and the focus detection pixels 22a, 22b, 23a, and 23b are each formed with an amplification transistor 27, a photodiode 28, and a capacitor 29. As shown in FIG. 4, where the imaging element 10 is a CMOS imaging element, pixels are designated by a vertical address circuit 24 by the row, and charge storing and pixel output reading are sequentially performed by the row in the Y-direction shown in FIG. 4, from an uppermost row to a lowermost row (line reading). The pixel outputting by the row is performed by a horizontal address circuit 26 via a noise removal circuit 25. When the pixel signal reading by the row is performed, a time lag ΔT is caused in each row. The time lag ΔT is of an order of tens of μs.

Since the imaging element 10 of the present embodiment is a solid-state imaging element of a CMOS type, a focus detection pixel row placed in the transverse direction (the X-direction) of the image capturing screen (the focus detection pixels 23a and 23b shown in FIG. 2) is arranged in the same direction as the line reading direction of the imaging signals of the imaging element 10. Accordingly, synchronism in charge storing time can be maintained between the focus detection pixels 23a and 23b. However, a focus detection pixel row placed in a direction such as the longitudinal direction (the Y-direction) other than the transverse direction of the image capturing screen (the focus detection pixels 22a and 23a shown in FIG. 2) is arranged in a different direction from the line reading direction of the imaging signals of the imaging element 10. As a result, synchronism in charge storing time cannot be maintained between the focus detection pixels 22a and 22b.

Therefore, when image movement is caused while charge storing is performed on the focus detection pixel row arranged in a direction other than the transverse direction of the image capturing screen or on the focus detection pixel row arranged in the direction without synchronism in charge storing time, misalignment due to the image movement is caused between the first image and the second image or between the first signal string {a(i)} and the second signal string {b(i)}. As a result, the image shift amount between the first image and the second image cannot be accurately calculated, and focus detection accuracy is degraded.

Figure 5:
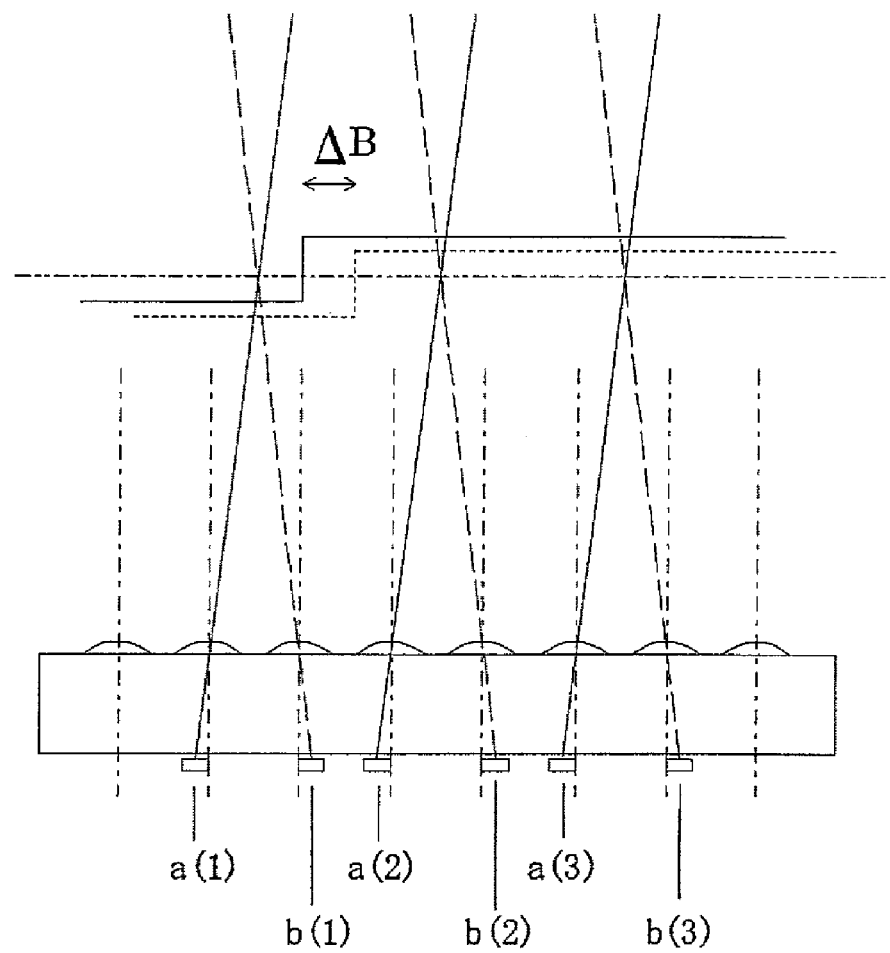
FIG. 5 is a diagram for explaining degradation of focus detection accuracy due to hand movement in a focus detection pixel array in an aligning direction without synchronism in charge storing time.

FIG. 5 is a diagram for describing the degradation of the focus detection accuracy due to hand movement in the focus detection pixel array in the direction without synchronism in charge storing time. FIG. 5 shows a case where image movement with a movement amount ΔB is caused due to hand movement or movement of the subject to be captured during a charge storing period of the focus detection pixels. If an arranging direction of the focus detection pixels a(1), b(1), a(2), b(2), a(3), b (3), ... is a direction without synchronism in charge storing time, there is a time lag ΔT in charge storage start time in each row. As a result, an error equivalent to the movement amount ΔB is caused in the image shift due to the image misalignment caused during the time lag ΔT in the charge storage start time between the first image signal string a(1), a(2), a(3), ... and the second image signal string b(1), b(2), b(3) ....

In the present embodiment, to correct the image shift error due to the movement amount ΔB, the following charge storage control and pixel output reading control are performed. As shown in FIG. 4, in the imaging element 10, pixels are designated by the vertical address circuit 24 by the row, and charge storing and pixel output reading are sequentially performed by the row, from the uppermost row to the lowermost row (line reading). The pixel outputting by the row is performed by the horizontal address circuit 26 via the noise removal circuit 25. In the present embodiment, after the charge storing and the pixel output reading are sequentially performed by the row from the uppermost row to the lowermost row, an order of charge storage control and pixel output reading is changed, and charge storing and pixel output reading are sequentially performed by the row, starting from the lowermost row to the uppermost row.

According to this method, there is an inversion between a positive and negative signs of the values of the image shift errors obtained when the charge storing and pixel output reading are performed from the uppermost row to the lowermost row and when the charge storing and pixel output reading are performed from the lowermost row to the uppermost row. Therefore, the body drive control device 11 calculates a mean value between the defocus amount in the focus detection calculation result based on the focus detection signals obtained by performing the charge storing and pixel output reading from the uppermost row to the lowermost row, and the defocus amount in the focus detection calculation result based on the focus detection signals obtained by performing the charge storing and pixel output reading from the lowermost row to the uppermost row. The body drive control device 11 then determines the focus amount to be used to calculate the drive amount of the focus lens 7. By doing so, the image shift errors due to the image movement caused during the time lag $\Delta T$ in execution time of the charge storing and pixel output reading by the row can be canceled, and the focus detection accuracy is increased.

Ultimate image shift amount $\Delta n$=(image shift amount $\Delta n1$ caused when scanning is started from the top+image shift amount $\Delta n2$ caused when scanning is started from the bottom)/2 (6)

Also, the ultimate defocus amount Df is determined by multiplying the ultimate image shift amount $\Delta n$ determined according to the equation (6) by the constant Kf depending on the detection opening angle:

$$Df=Kf^*\Delta n \quad (7)$$

Modification of the Embodiment

In the above-described embodiment, focus detection pixels each having a photoelectric converter provided under a microlens have been described. However, it is also possible to use focus detection pixels each having a pair of photoelectric converters provided under each one microlens. The pair of photoelectric converters receive focus detection light fluxes that have passed through a pair of different regions of the exit pupil of the image capturing lens. If there is a time lag in the charge storing and pixel output reading between an output a(i) and an output b(i) of the pair of photoelectric converters corresponding to the pair of pupil regions, the focus detection accuracy can be increased by correcting the image shift error due to the image movement amount $\Delta B$ in the above described manner. Reading may also be performed not only on the focus detection pixels arranged in the Y-direction shown in FIG. 2, but also on focus detection pixels arranged diagonally with respect to the X-direction.

Figure 6:
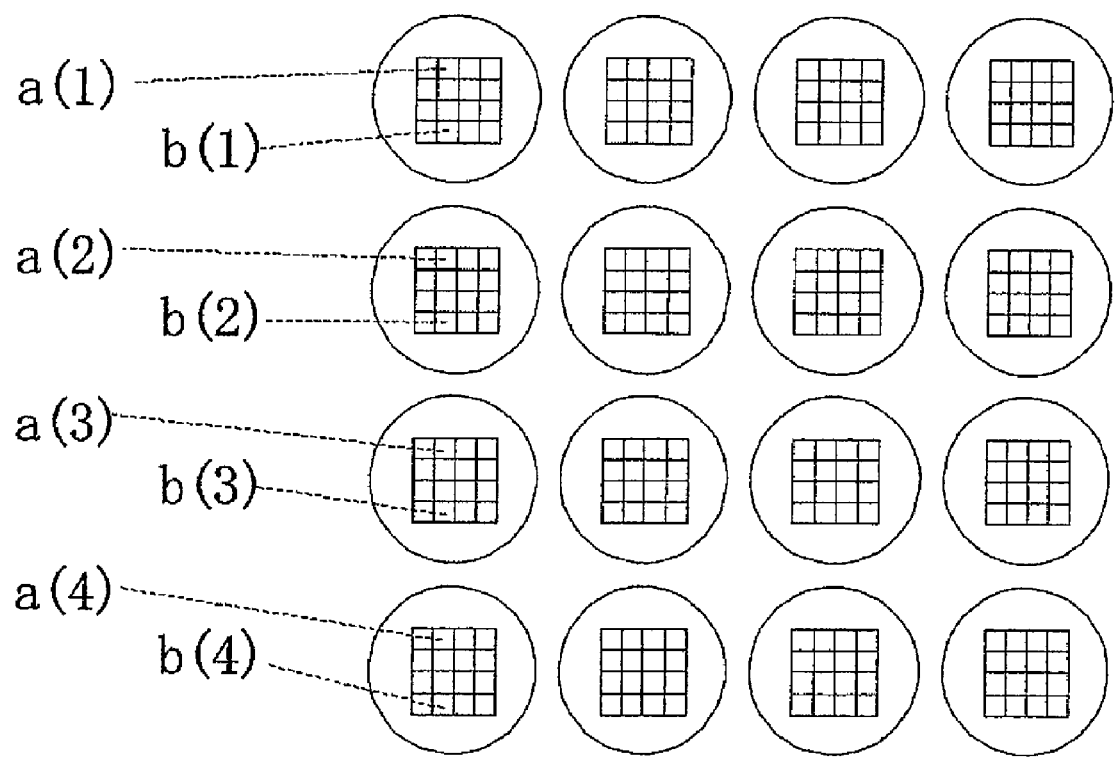
FIG. 6 shows a structure of an imaging element of a modification.

As shown in FIG. 6, it is also possible to use focus detection pixels each having a number of photoelectric converters under each one microlens, so as to obtain a number of pupil divisional data sets. If there is a time lag in charge storing and pixel output reading between the output a(i) and the output b(i) of pixels in a pair, the focus detection accuracy can also be increased by correcting the image shift error due to the image movement amount $\Delta B$ in the above described manner.

In the above-described embodiment, an imaging element having a microlens array has been described. In a focus detection device of a divided pupil re-imaging type, however, the focus detection accuracy can also be increased by correcting the image shift error due to the image movement amount $\Delta B$ in the above described manner, if there is a time lag in charge storing and pixel output reading between the outputs a(i) and b(i) of the photoelectric converters corresponding to the pair of regions located above the exit pupil of the image capturing lens.

Figure 7:
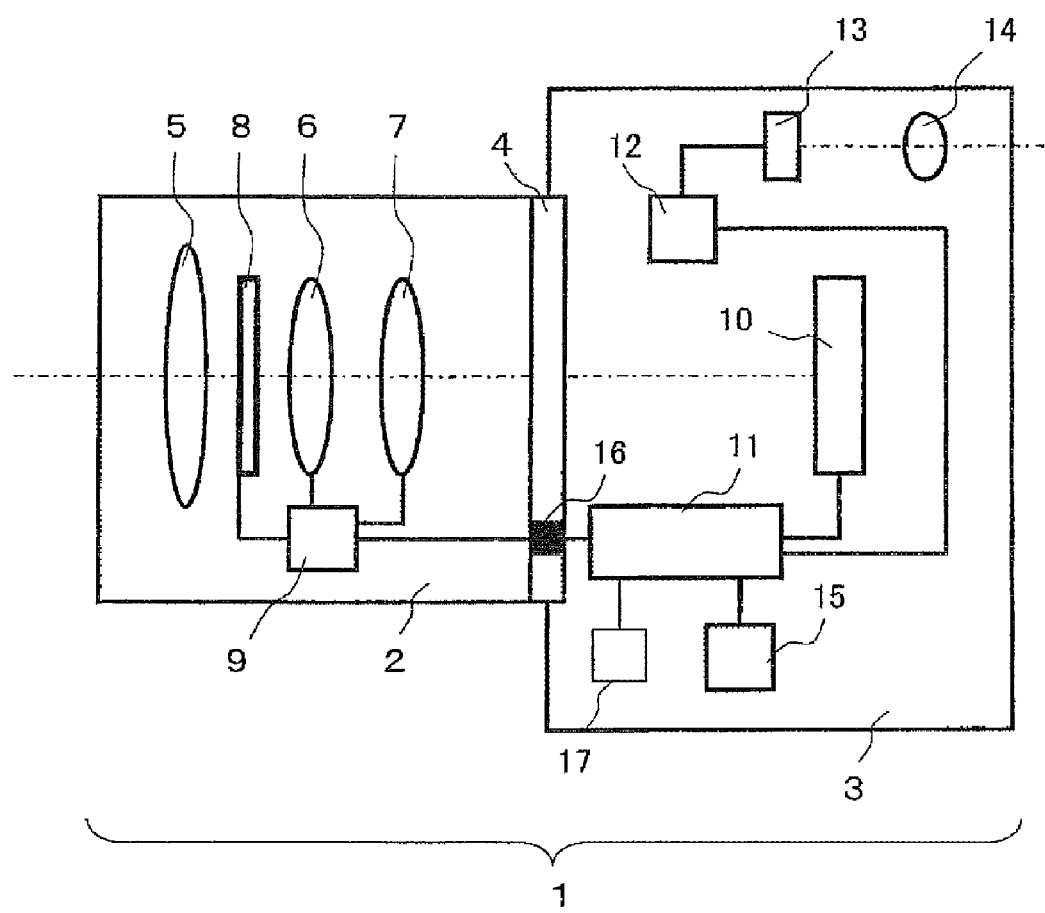
FIG. 7 shows a structure of a camera in accordance with another embodiment.

FIG. 7 shows a structure of a camera in accordance with another embodiment that adds a hand movement detection sensor to the camera of the above embodiment. The structure shown in FIG. 7 is the same as the structure of the camera shown in FIG. 1, except that an angular velocity sensor 17 is provided as a hand movement detection sensor. The angular velocity sensor 17 is a sensor that determines how many times the angular velocity sensor 17 revolves about a reference axis in a predetermined period of time. In the present embodiment, the angular velocity sensor 17 can detect the angular velocity $\theta$ of the camera body 3 and the interchangeable lens unit 2 revolving due to hand movement. When charge storing and pixel output reading are performed on the focus detection pixels 22a and 22b arranged in the longitudinal direction (Y-direction) shown in FIG. 2, the body drive control device 11 reads the angular velocity $\theta$ in the aligning direction of the focus detection pixels 22a and 22b from the output signal of the angular velocity sensor 17, in synchronization with a read time of a center portion of the array of the focus detection pixels 22a and 22b (a portion that has the largest contribution to the shift detection in the array). The direction of the hand movement is recognized from the positive or negative sign of the angular velocity $\theta$. The body drive control device 11 then recognizes the direction of the hand movement from output signals of the angular velocity sensor 17 in both cases where the charge storing and pixel output reading are performed on the focus detection pixels in a forward direction or from the uppermost row to the lowermost low, and where the charge storing and pixel output reading are performed on the focus detection pixels in a reverse direction or from the lowermost row to the uppermost row. If there is a difference in hand movement between a case of the forward-direction reading and a case of the reverse-direction reading, the body drive control device 11 determines that it is inappropriate to correct the image shift error according to the equation (6), and does not perform the correction according to the equation (6). If the direction of the hand movement is the same in both cases of the forward-direction reading and the reverse-direction reading, the body drive control device 11 performs the correction of the image shift error according to the equation (6).

What is claimed as new and is desired to be secured by Letters Patent of the United States is:

1. A focus detection device comprising:
    an imaging element that is provided on a light path of a light flux incident via an optical system and that has a plurality of pixels of charge storage type two-dimensionally arranged;
    a storage controller configured to control the imaging element to sequentially store charges in pixels arranged in a first direction among the plurality of pixels to generate a first output and configured to control to sequentially store charges in pixels arranged in a second direction opposite to the first direction to generate a second output; and
    a focus detector configured to detect a focus adjustment state of the optical system based on a combination of both the first output obtained when the storage controller sequentially performs storage control in the first direction and the second output obtained when the storage controller sequentially performs storage control in the second direction.

2. The focus detection device according to claim 1, wherein the storage controller is configured to perform a control sequentially in a fourth direction perpendicular to a third direction, charges being simultaneously stored in pixels arranged in the third direction perpendicular to the first direction in the control.

3. The focus detection device according to claim 2, wherein the fourth direction includes the first direction or the second direction.

4. The focus detection device according to claim 1, wherein the focus detector determines the focus adjustment state of the optical system by calculating a mean value between a focus adjustment state determined based on the first output and the second output.

5. The focus detection device according to claim 1, further comprising:

a movement detector configured to detect a movement direction of an image formed by the optical system, wherein the focus detector prohibits detection of the focus adjustment state of the optical system based on the first output and the second output when the movement direction of the image detected by the movement detector differs between the first direction and the second direction.

6. The focus detection device according to claim 1, wherein the imaging element comprises imaging pixels configured to receive the light flux via the optical system and output an image signal, the imaging pixels being arranged in a two-dimensional array; and a focus detection pixel row provided in the array and arranged in the first direction.

7. An imaging apparatus comprising the focus detection device according to claim 1.

8. A focus detection method comprising:

arranging a plurality of charge storage pixels in a two-dimensional fashion on a light path of a light flux incident via an optical system;

controlling pixels arranged in a first direction among the plurality of pixels to store charges in a sequential manner to generate a first output, and controlling pixels arranged in a second direction opposite to the first direction to store charges in a sequential manner to generate a second output; and detecting a focus adjustment state of the optical system based on a combination of both the first output obtained when storage control is sequentially performed in the first direction and the second output obtained when storage control is sequentially performed in the second direction.

9. The focus detection method according to claim 8, wherein a control in which charges are simultaneously stored in pixels arranged in a third direction perpendicular to the first direction is performed sequentially in a fourth direction perpendicular to the third direction.

10. The focus detection method according to claim 9, wherein the fourth direction includes the first direction or the second direction.

11. The focus detection method according to claim 8, wherein the step of detecting the focus adjustment state includes determining the focus adjustment state of the optical system by calculating a mean value between a focus adjustment state determined based on the first output and the second output.

12. The focus detection method according to claim 8, further comprising:

detecting a movement direction of an image formed by the optical system, wherein detecting the focus adjustment state of the optical system based on the first output and the second output is prohibited when the detected movement direction of the image differs between the first direction and the second direction.

13. The focus detection method according to claim 8, wherein the step of arranging the plurality of pixels includes arranging, in a two-dimensional array, imaging pixels that receive the light flux via the optical system and output an image signal; and arranging a focus detection pixel row in the first direction in the array of the imaging pixels.

* * * * *